(No Model.)

2 Sheets—Sheet 1.

T. E. MARTIN.
WINDMILL.

No. 252,116.

Patented Jan. 10, 1882.

Witnesses
Geo. H. Strong.
Frank A. Brooks

Inventor
Thomas E. Martin
By Dewey & Co.
Attys (No Model.) 2 Sheets—Sheet 2.
T. E. MARTIN.
WINDMILL.
No. 252,116. Patented Jan. 10, 1882.
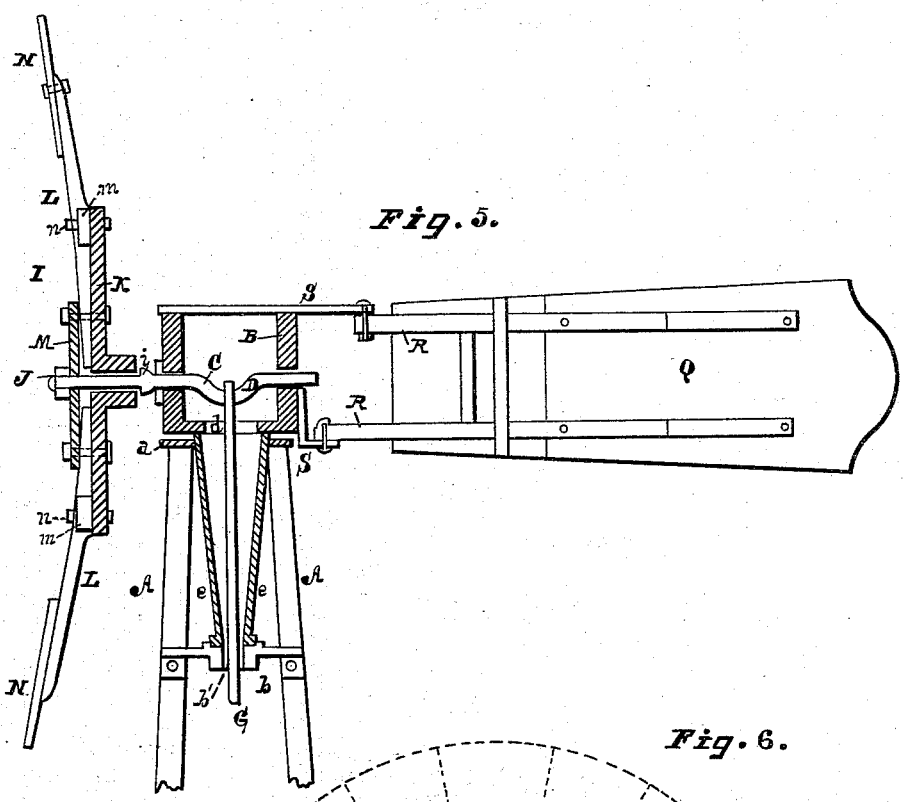
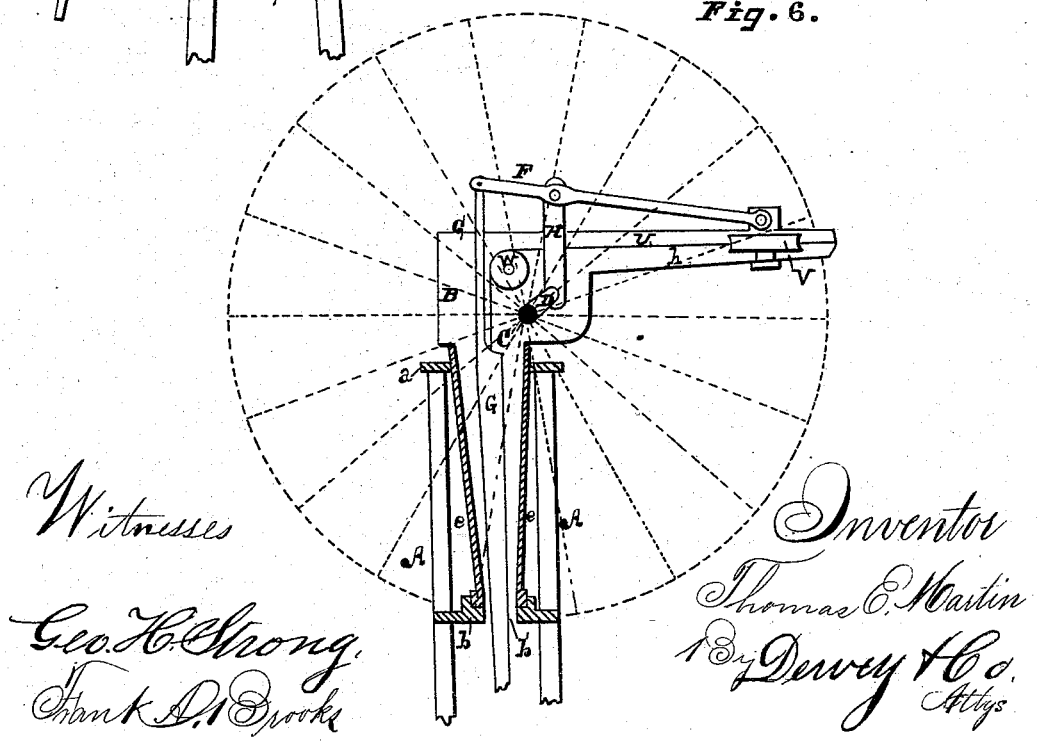
Witnesses
Geo. H. Strong.
Frank A. Brooks.
Inventor
Thomas E. Martin
By Dewey & Co.
Attys

UNITED STATES PATENT OFFICE.

THOMAS E. MARTIN, OF SAN JOSÉ, CALIFORNIA.

WINDMILL.

SPECIFICATION forming part of Letters Patent No. 252,116, dated January 10, 1882.

Application filed October 3, 1881. (No model.)

*To all whom it may concern:*

Be it known that I, THOMAS E. MARTIN, of San José, county of Santa Clara, State of California, have invented an Improvement in Windmills; and I do hereby declare the following to be a full, clear, and exact description thereof.

My invention has relation to the class of windmills and to improvements in the construction of certain parts thereof, whereby I am enabled to provide a strong and useful mill.

These improvements consist in the construction of the wheel and the blades, all of which will be hereinafter fully described.

Figure 1:
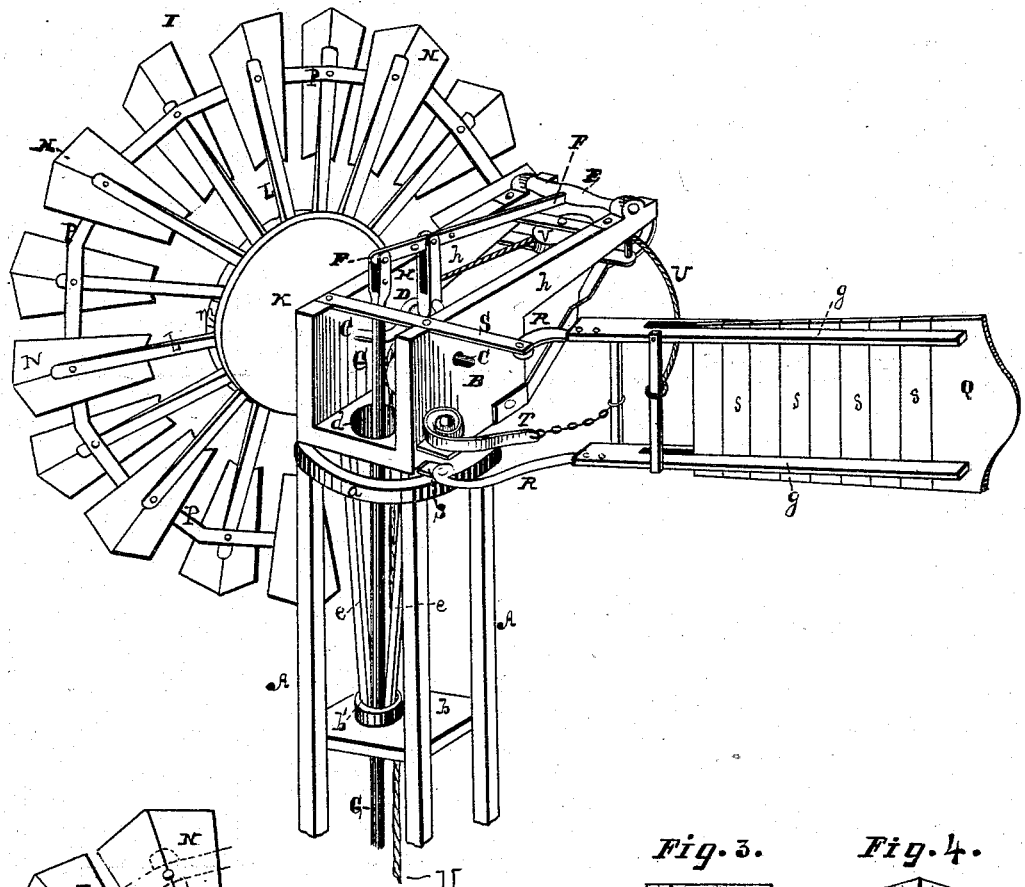
Figure 2:
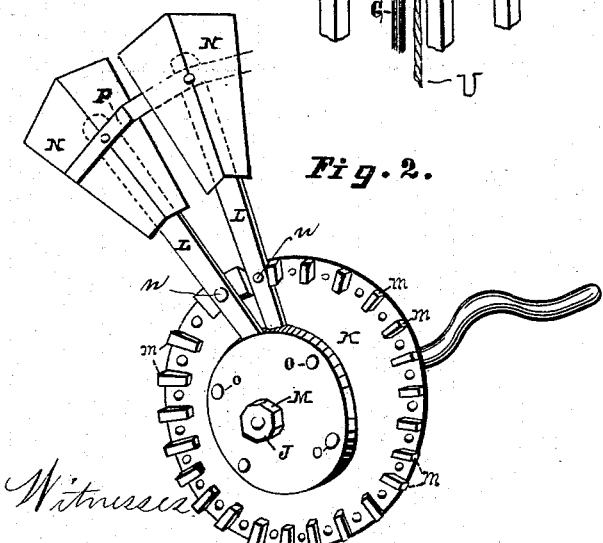
Figure 3:
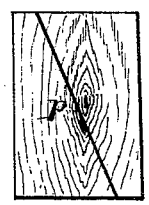
Figure 4:
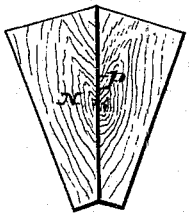

Referring to the accompanying drawings, Figure 1 is a perspective view of my windmill. Fig. 2 is a detail of construction of the wheel. Figs. 3 and 4 are views of the fan and its construction. Fig. 5 is a vertical section through wheel and frame. Fig. 6 is a vertical section through frame.

These improvements I have made upon a mill represented and described in Letters Patent No. 210,950, December 17, 1878, issued to me, and in the present case I therefore show parts of said mill for the more full and correct understanding of my invention.

Let A A represent posts supporting the wheel turn-table. Upon top of these posts is a collar, *a*, and a short distance below it a plate, *b*, provided with a central socket, *b'*.

Let B represent the turn-table, having an aperture, *d*, and downwardly-extending supports *e e*, passing through the collar *a* and terminating in the central socket, *b'*, of the plate *b*, which thus forms a suitable bearing for the turn-table. Through the sides of the turn-table B, out of line of the aperture *d* therein, passes the wheel-shaft C, having a crank, D.

Upon one end of the shaft C is keyed the wheel I. An enlargement or shoulder, *i*, upon the shaft prevents the wheel from slipping too far in.

To the outer ends of the diverging arms L are secured the fans or blades N. These are made by dividing a piece having the shape of a parallelogram, as shown in Fig. 3, by a line marked *p*, cut diagonally, then turning one piece so that the narrow ends of both are brought together, the cut or diagonal edges, as shown by the line *p*, still remaining together and the straight edges on the outside, when the piece will bear the form shown in Fig. 4. The two pieces are then secured appropriately. The advantage of this is that I obtain the fan shape and throw all the short grains of the wood to the center, keeping the long ones on the outside, whereby the greatest strength is obtained. The fans thus made are bolted to the ends of the arms L. A metal strap or band, P, is bolted or secured to the top of one arm, and thence proceeding is bent to go behind the next fan and is bolted to the top of the next arm, and so on, being thus interwoven in the blades or fans. This secures the outer circumference of the entire wheel, and keeps it firmly together.

Having thus described my invention, what I claim as new, and desire to secure by Letters Patent, is—

1. The improved blade for windmills, consisting of two halves of a parallelogram of timber divided on a diagonal line, *p*, and secured together with their narrow ends coincident, as described.

2. A wind-wheel consisting of the hub K, with its lugs *m*, the face-plate M, arms L, blades or fans N, constructed as described, and the sinuous or interwoven strap P, when arranged and combined as herein described.

In witness whereof I hereunto set my hand.

THOMAS E. MARTIN.

Witnesses:
 JAMES A. CLAYTON,
 JAMES B. CAPP.